(12) United States Patent
Nishizawa et al.

(10) Patent No.: US 11,881,897 B2
(45) Date of Patent: Jan. 23, 2024

(54) OPTICAL AND ELECTRONIC INTEGRATED SWITCH AND OPTICAL NETWORK SYSTEM

(71) Applicant: Nippon Telegraph and Telephone Corporation, Tokyo (JP)

(72) Inventors: Hideki Nishizawa, Musashino (JP); Seiki Kuwabara, Musashino (JP); Seiji Okamoto, Musashino (JP); Shuto Yamamoto, Musashino (JP); Tetsuro Inui, Musashino (JP); Shunichi Soma, Musashino (JP); Kenya Suzuki, Musashino (JP); Osamu Moriwaki, Musashino (JP); Keita Yamaguchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/801,130

(22) PCT Filed: Feb. 26, 2020

(86) PCT No.: PCT/JP2020/007845
§ 371 (c)(1),
(2) Date: Aug. 19, 2022

(87) PCT Pub. No.: WO2021/171439
PCT Pub. Date: Sep. 2, 2021

(65) Prior Publication Data
US 2023/0082854 A1   Mar. 16, 2023

(51) Int. Cl.
*H04B 10/61*     (2013.01)
*H04B 10/2575*   (2013.01)
*H04L 45/00*     (2022.01)

(52) U.S. Cl.
CPC ....... *H04B 10/61* (2013.01); *H04B 10/25759* (2013.01); *H04L 45/56* (2013.01)

(58) Field of Classification Search
CPC .................................................... H04B 10/61
See application file for complete search history.

(56) References Cited

U.S. PATENT DOCUMENTS 9,071,364 B1 *  6/2015  Voois ..................... H04B 10/58
2003/0161635 A1 *  8/2003  Milton ................ H04J 14/0213
                                                            398/79

(Continued)

FOREIGN PATENT DOCUMENTS

| JP | 2012-4842 A   | 1/2012  |
| JP | 2012-248925 A | 12/2012 |
| JP | 5681394 B2    | 3/2015  |

OTHER PUBLICATIONS

The Consortium for On-Board Optics, *Consortium for On-Board Optics The Use of On-Board Optic Compliant Modules in Coherent Applications*, COBO Coherent Application Note, Mar. 2019, pp. 1-39.

(Continued)

*Primary Examiner* — Nathan M Cors
(74) *Attorney, Agent, or Firm* — Workman Nydegger

(57) ABSTRACT

A photo-electron fusion switch that can perform optical communications without any trouble, even when nodes of a communication source and a communication partner that are large in transmission capacity are connected, and makes it possible to realize a concentrated arrangement of devices having similar functions and reduce the communication processing time is connected to communication source's information processing devices and communication partner's information processing devices and information processing devices that are each different in transmission speed so as to configure an optical network system. The photo- (Continued)

electron fusion switch includes a network processor of an electronic circuit for controlling packet switch functions, a plurality of optical transmitter/receivers that can support coherent communications and has a photoelectric conversion function capable of transmitting and receiving optical signals different in transmission speed, an optical line switching device, and a plurality of multiplexing/separators. Each multiplexing/separator simultaneously transmits and receives respective optical signals different in transmission speed to and from the nodes via optical waveguides.

8 Claims, 7 Drawing Sheets

(56) References Cited

U.S. PATENT DOCUMENTS

2010/0135659 A1* 6/2010 Kim .................. H04Q 11/0005
398/79
2011/0135302 A1* 6/2011 Kang .................. H04J 14/0269
398/43
2014/0301733 A1* 10/2014 Hu .......................... H04J 14/08
398/25

OTHER PUBLICATIONS

The Consortium for On-Board Optics, *Optical Connectivity Options for 400 Gbps and Higher On-Board Optics*, A COBO White paper, Revision1.0, Mar. 2019, pp. 1-34.
Nathan Farrington et al., *Helios: A Hybrid Electrical/Optical Switch Architecture for Modular Data Centers*, Proceedings of the ACM SIGCOMM 2010 Conference on SIG-COMM (SIGCOMM'10), Aug. 30, 2010, pp. 1-12.
*IEEE 802.3 Beyond 10km Optical PHYs SG—The Path Forward*, IEEE 802.3 Beyond 10km Optical PHYs Study Group IEEE 802, Nov. 2017, pp. 1-13.

* cited by examiner

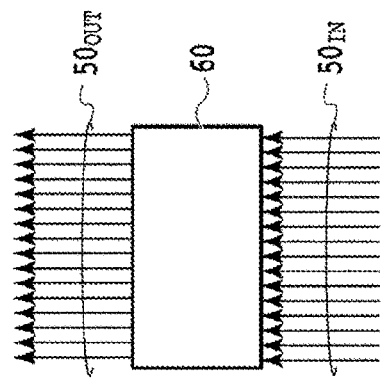
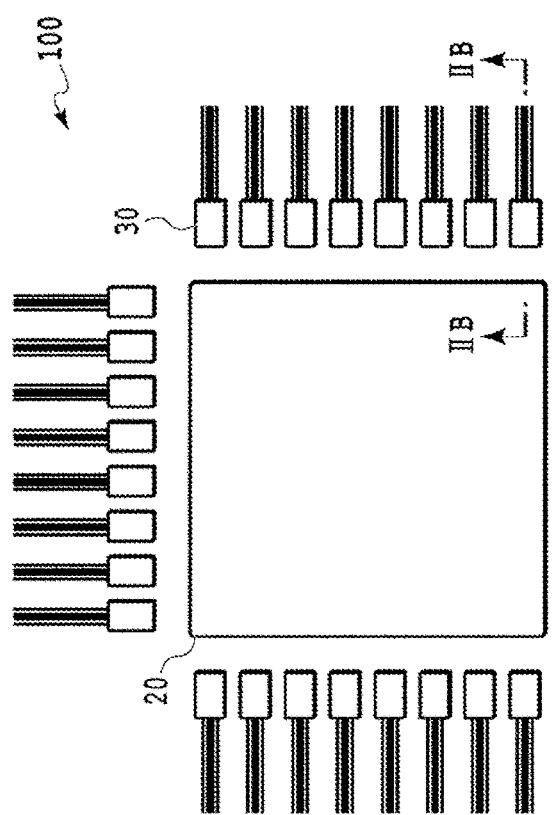
Fig. 2(A)
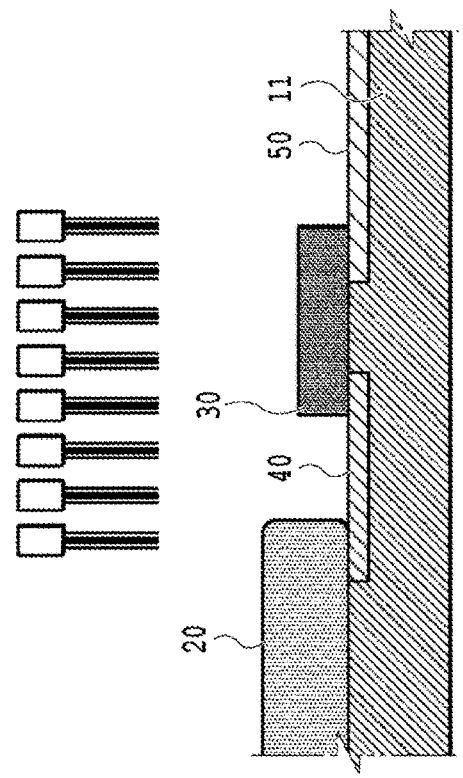
Fig. 2(B)

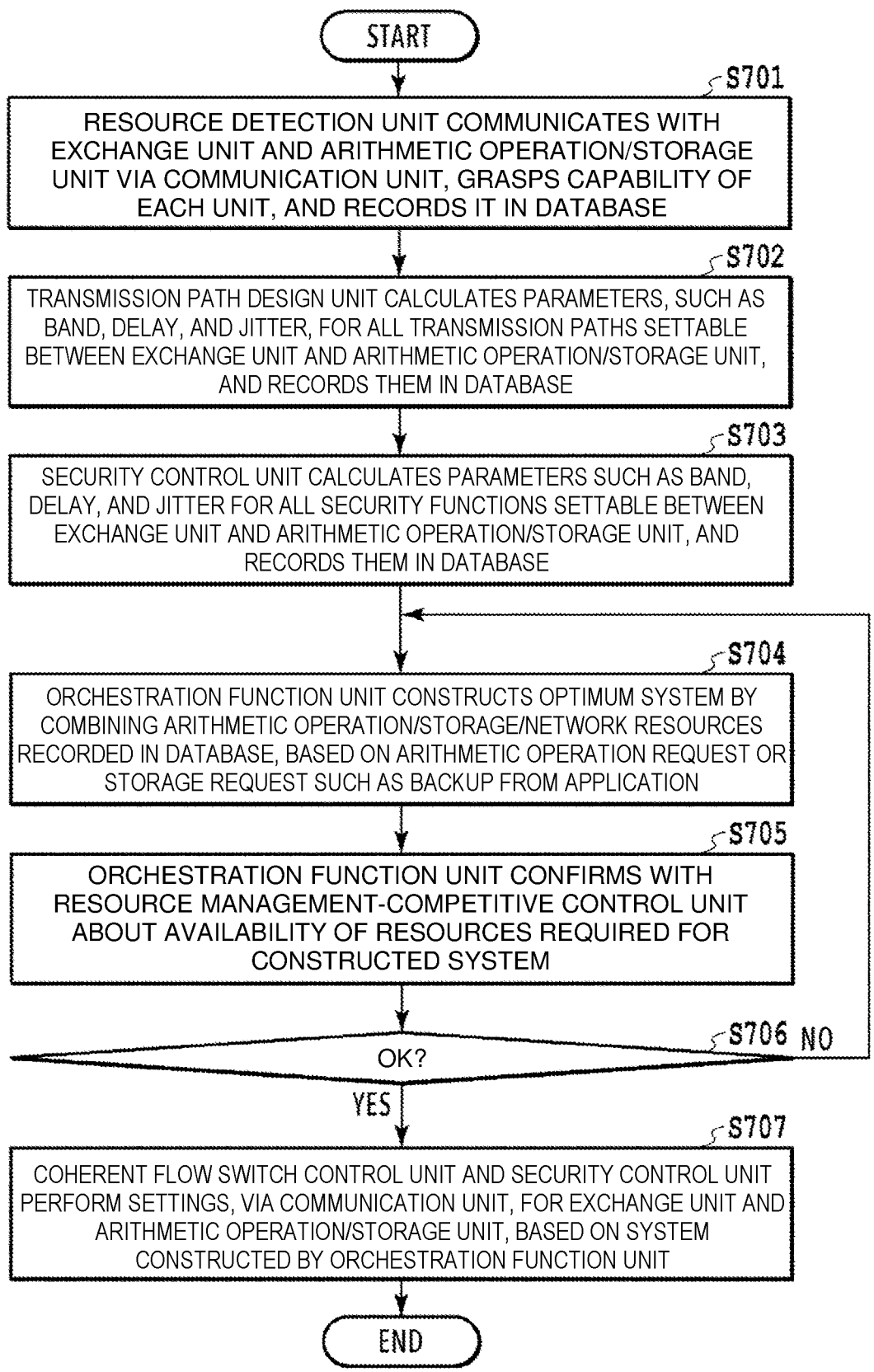

OPTICAL AND ELECTRONIC INTEGRATED SWITCH AND OPTICAL NETWORK SYSTEM

TECHNICAL FIELD

The present invention relates to a high-performance photo-electron fusion switch belonging to a network switch, and an optical network system.

BACKGROUND ART

Conventionally, electronic circuit-based packet switches are often used as network switches usable on the Internet. The capacity of a network processor, which is an exemplary electronic circuit that controls this packet switch, tends to increase year by year. The capacity of this network processor is given by a value obtained by multiplying the signal speed and the number of ports. However, when the capacity of the network processor increases, the signals input to and output from the network processor increase correspondingly. Therefore, it is necessary to enhance the wiring (which may be called electrical wiring) through which electric signals to be used for input and output pass, or increase the signal speed.

The signal propagating in the electrical wiring has a propagable distance that becomes shorter as the signal speed increases. On the other hand, the density of electrical wiring cannot be increased beyond the physical upper limit. Therefore, if the capacity of the network processor increases, propagating electric signals becomes difficult even when the distance is within a board. Under these circumstances, it is being currently studied to convert an electric signal into an optical signal within a propagable distance and adopt optical wiring suitable for long-distance transmission compared with the electric signal. Non-Patent Literature 1 and Non-Patent Literature 2 disclose techniques relating to such contents.

Further, a technique that embodies the above-described matter for study is also proposed. For example, Non-Patent Literature 1 discloses the application of an optical transmitter/receiver, in which an electronic circuit such as a network processor is arranged in parallel with the optical transmitter/receiver having a photoelectric conversion function on a substrate, and the electronic circuit and the optical transmitter/receiver are connected by metal wiring or the like that is an electrical conductor.

FIG. 1 is a diagram illustrating a schematic configuration seen from the upper surface direction when the technique disclosed in Non-Patent Literature 1 is applied to a network switch 10. When FIG. 1 is referred to, this network switch 10 includes, on an upper surface of a substrate 1, a network processor 2 and an optical transmitter/receiver 3 having a photoelectric conversion function. These devices are configured so as to be connected by metal wiring 4. The network processor 2 is an electronic circuit that provides core functions of the packet switch, which is generally configured as an ASIC (Application Specific Integrated Circuit) in many cases. The optical transmitter/receiver 3 is a compact component configured so as to include a light receiving unit (RX) 3a, a laser (LASER) 3b, an electric processing function unit 3c, and a light transmitting unit (TX) 3d, which are internally modularized, and also include a connector 3e, optical fibers 3f, and the like. This optical transmitter/receiver 3 enables high-density packaging like tiles when a plurality of optical transmitter/receivers 3 are arranged in parallel on the substrate 1.

Regarding the optical transmitter/receiver 3, in the case of coherent detection, the light receiving unit 3a plays the role of selectively enhancing an optical signal whose wavelength is close to that of the laser 3b, of optical signals input from the connected optical fibers 3f, and optical/electrically converting the enhanced optical signal into an electric signal. The electric processing function unit 3c plays the role of performing digital signal processing on electric signals when transmitting and receiving signals to and from the network processor 2, and amplifying the electric signals at the time of optical transmission/reception. The light transmitting unit 3d plays the role of performing electrical/optical conversion by modulating light input from the laser 3b using an electric signal input from the electric processing function unit 3c, and outputting the converted signal to the connected optical fiber 3f. The connector 3e is provided for connection with the network processor 2.

In general, the network processor 2 provides a packet switch function that is functionally high in that the destination can be designated for each packet. However, electric power consumption per processing capacity is large. On the other hand, the optical switch generally takes time for route switching, and therefore its application is limited to the case of fixing the route or switching in flow units that continues for a long time. However, the optical switch is small in electric power consumption required in switching compared with that of the packet switch, and the value is almost constant without depending on the signal speed. The packet switch by the network processor 2 can be regarded as an electric switch. Further, the combination of an electric switch and an optical switch is called a hybrid switch. Patent Literature 1 discloses a photoelectric hybrid as an example of well-known techniques relating to a system configuration in which multiple hybrid switches having the above-mentioned configuration are connected.

Recently, in order to save electric power in optical networks, the optical switch and the packet switch are caused to cooperate to make efforts in the case of a large amount of signal flow (flow) that uses the same pair of input-output ports in the traffic passing through the packet switch. That is, in such a case, a technique for directly connecting the pair of input-output ports via the optical switch without inputting the flow into the packet switch, which is called an optical cut-through architecture, is applied.

Further, in order to reduce the electric power consumption of the network switch, there is a technique being currently studied in which the optical switch and the packet switch are installed in parallel with each other so that a flow continuing for a long time is transmitted to the optical switch, thereby reducing the switching capacity required for the packet switch. That is, here, the optical switch taking charge of the flow with lower switching frequency can reduce the switching capacity required for the packet switch. Non-Patent Literature 3 discloses a technique relating to such contents.

Further, in a coherent communication technique developed and expanded for long distance transmissions, the tendency of packaging for miniaturizing a device to be used, in addition to the reduction of electric power consumption, is rapidly developing. The coherent communication technique is attracting attention for its large-capacity that exceeds the amount of information that can be handled by the intensity modulation/direct detection (IM-DD) method, and is expected to be applied to the next generation of optical network systems constructed by connecting nodes between communication sources and communication partners. Non-Patent Literature 4 discloses a technique relating to such contents.

By the way, in the case of applying the optical cut-through architecture to well-known network switches, a configuration in which an optical switch is added and combined with a packet switch that is functionally completed is assumed. However, adopting the configuration combining these separate devices will raise the following problems.

For example, since the packet switch and the optical switch are separate devices, they are necessarily mounted separately even when there are some functionally similar devices to be mounted. This also raises an inconvenience-relevant problem of not being able to reduce the costs because the functionally similar devices cannot be concentratedly arranged in one place. For example, regarding the packet switch and the optical switch, even when a device for exerting an optical signal transmission/reception function and a device for exerting an optical transmission/reception function of the optical transmitter/receiver are similar to each other, it is necessary to separately mount these similar devices for each of the packet switch and the optical switch.

Further, when the packet switch and the optical switch are separate devices, it is necessary to provide a timing margin and accordingly there is a problem that extra communication processing time is required. For example, it is necessary to prevent unexpected packet loss or the like when changing the route of the optical switch, and therefore it is necessary to adjust the control order and control timing for the packet switch and the optical switch. However, when the packet switch and the optical switch are separate devices, sequentially executing the control procedure at fixed timing without providing any timing margin will cause a packet loss. In order to avoid this, taking measures such as confirming previous processing results and then executing the next control procedure will require an unnecessary communication processing time considerably.

Further, in existing network switches, if the total signal processing capacity, which can be estimated by the product of the bandwidth of an optical transmitter/receiver and the mountable number, is large compared to the signal processing capacity of the network processor, there is a risk that the photoelectric conversion function of the optical transmitter/receiver may not be sufficiently exerted.

In addition, in the case of existing network switches, if the nodes of the communication source and the communication partner are client computers, it is necessary to provide dedicated interfaces separately from interfaces of for the packet switch and the optical switch. However, there is a problem that the dedicated interfaces for the client computers are complicated in wiring for connection.

In addition, in the case of constructing an optical network system using existing network switches, it is necessary to design an application according to a request from a user before starting communications between the nodes of the communication source and the communication partner. Therefore, it is usual that a controller is operated in such a way as to perform necessary control according to the designed application for the nodes of the communication source and the communication partner, and open the path. In such control, it is general that route control, band control, and the like are dynamically performed in layer 2 network and above but layer 1 network and below are not used.

However, in such an operation mode, applications for causing the nodes of the communication source and the communication partner that are large in transmission capacity to stably perform optical communications are not sufficiently considered. Therefore, in existing network switches, dynamically changing the optical transmission line control according to a request of the application is difficult. Further, in such an optical network system, in order to avoid a problem that the transmittable distance is shortened with increasing transmission capacity of the optical signal that may occur when a communication source's node is connected to a packet switch closet to a communication partner's node far from the communication source's node, the communication source's node is connected to the nearest packet switch. Therefore, there is a problem that it is difficult to effectively use information about remotely located resources.

In short, in existing network switches, when the packet switch and the optical switch are separate devices, it is difficult to concentratedly arranging devices having similar functions and reduce the communication processing time. Further, in existing network switches, if the total number of optical transmitter/receivers to be used is large, the photoelectric conversion function of the optical transmitter/receiver may not be sufficiently exerted. The tendency of such a problem is considered to be further increased when the nodes connected as the communication source and the communication partner are client computers or the like that are large in transmission capacity, because it is necessary to provide dedicated interfaces. Further, in existing network switches, in the case of constructing an optical network system, dynamically changing the optical transmission line control according to an application's request is difficult, and therefore there is a problem that the information about remotely located resources cannot be effectively utilized.

CITATION LIST

Non-Patent Literature

Non-Patent Literature 1: "Consortium For On-Board Optics The Use of On-Board Optic Compliant Modules in Coherent Applications" COBO Release 1.0 Whitepaper (http://onboardoptics.org/wp-content/uploads/2019/05/COBO-CohOBO-AppNote-March-2018.pdf)

Non-Patent Literature 2: "Optical Connectivity Options for 400 Gbps and Higher On-Board Optics" COBO Connectivity Whitepaper, Revision 1.0 (http://onboardoptics.org/wp-content/uploads/2019/03/COBO-Optical-Connectivity-Whitepaper-March-2019.pdf)

Non-Patent Literature 3: "Helios: A Hybrid Electrical/Optical Switch Architecture for Modular Data Centers" Nathan Farrington, George Porter, Sivasankar Radhakrishnan, Hamid Hajabdolali Bazzaz, Vikram Subramanya, Yeshaiahu Fainman, George Papen, and Amin Vandat [In: Proceedings of the ACM SIGCOMM 2010 Conference on SIG-COMM (SIGCOMM '10), pp. 339-350 (2010): University of California, San Diego]

Non-Patent Literature 4: "IEEE 802.3 Beyond 10 km Optical PHYs SG—The Path Forward" John D'Ambrosia, Chair, IEEE 802.3 Beyond 10 km Optical PHYs Study Group Futurewei, Subsidiary of Huawei [IEEE 802.3 Beyond 10 km Optical PHYs Study Group IEEE 82 November 2017 Plenary]

Patent Literature

Patent Literature 1: Japanese Patent No. 5681394

SUMMARY OF THE INVENTION

The present invention has been made to solve the above-described problems. A main object of embodiments according to the present invention is to provide a photo-electron fusion switch that can perform optical communications without any trouble, even when nodes of a communication source and a communication partner that are large in transmission capacity are connected, and makes it possible to realize a concentrated arrangement of devices having similar functions and reduce the communication processing time.

Another object of embodiments according to the present invention is to provide an optical network system that can dynamically change optical transmission line control according to an application's request, and can effectively utilize information about remotely located resources.

In order to achieve the above-described main object, an aspect of the present invention is a photo-electron fusion switch that includes a packet switch and an optical device and is connected to nodes of a communication source and a communication partner, in which the packet switch includes an electronic circuit and a plurality of optical transmitter/receivers each having a photoelectric conversion function and provided in a vicinity of the electronic circuit, a route connecting the electronic circuit and the plurality of optical transmitter/receivers is wiring through which electric signals pass, a route connecting the plurality of optical transmitter/receivers and the optical device and a route connecting the optical device or plurality of optical transmitter/receivers and input-output ports of the photo-electron fusion switch are optical waveguides, and the plurality of optical transmitter/receivers can transmit and receive optical signals different in transmission speed to and from the nodes of the communication source and the communication partner, and are configured to input the optical signals transmitted from the nodes, output optical/electrically converted electric signals to the electronic circuit, and transmit optical signals obtained by electrical/optically converting electric signals output from the electronic circuit to the nodes.

According to the above-described configuration, each optical transmitter/receiver configuring a packet switch can transmit and receive optical signals different in transmission speed to and from the nodes of the communication source and the communication partner. Therefore, even when the nodes of the communication source and the communication partner that are large in transmission capacity are connected, optical communications can be performed without any trouble, and it becomes possible to realize a concentrated arrangement of devices having similar functions and reduce the communication processing time.

Further, to achieve the above-described other object, another aspect of the present invention is an optical network system that includes the above-described photo-electron fusion switch and nodes of a communication source and a communication partner, in which a controller is provided to perform necessary control for the nodes according to an application designed in advance, the nodes are information processing devices, and the controller sets to and causes the information processing devices to execute, as the necessary control, at least one of delay and jitter controls relating to optical signal or electric signal in all transmission paths to be used, and route/resource information competitive control, plan control, and safety control in all the transmission paths using previously acquired network-related resource information, plan information, and safety information, in addition to route control and band control in the photo-electron fusion switch.

According to the above-described configuration, the controller of the optical network system enables the information processing device to execute the delay or jitter control in all transmission paths, the route/resource information competitive control, the plan control, and the safety control, in addition to the route control and the band control. Therefore, the optical transmission line control can be dynamically changed according to an application's request and the information about remotely located resources can be effectively utilized.

BRIEF DESCRIPTION OF DRAWINGS

FIG. 2 is a diagram illustrating a schematic configuration of a photo-electron fusion switch according to a preferred embodiment of the present invention, in which (A) is a plan view illustrating the photo-electron fusion switch seen from the upper surface direction, and (B) is a side cross-sectional view illustrating a partial (A) in a state where the photo-electron fusion switch is mounted on a substrate, taken along a direction of arrow IIB.

FIG. 7 is a flowchart illustrating the outline of operation processing relating to various control settings for the information processing devices performed by the controller according to the application illustrated in FIG. 6.

DESCRIPTION OF EMBODIMENTS

Hereinafter, photo-electron fusion switches and optical network systems according to some embodiments of the present invention will be described in detail below with reference to attached drawings.

First, the technical overview of a photo-electron fusion switch according to a preferred embodiment of the present invention will be simply described with reference to FIG. 2. FIG. 2 is a diagram illustrating a schematic configuration of a photo-electron fusion switch 100 according to the preferred embodiment of the present invention. FIG. 2(A) is a plan view illustrating the photo-electron fusion switch 100 seen from the upper surface direction. FIG. 2(B) is a side cross-sectional view illustrating a part of the photo-electron fusion switch 100 in a state mounted on a substrate 11, taken along a direction of arrow IIB in FIG. 2(A).

Figure 1:
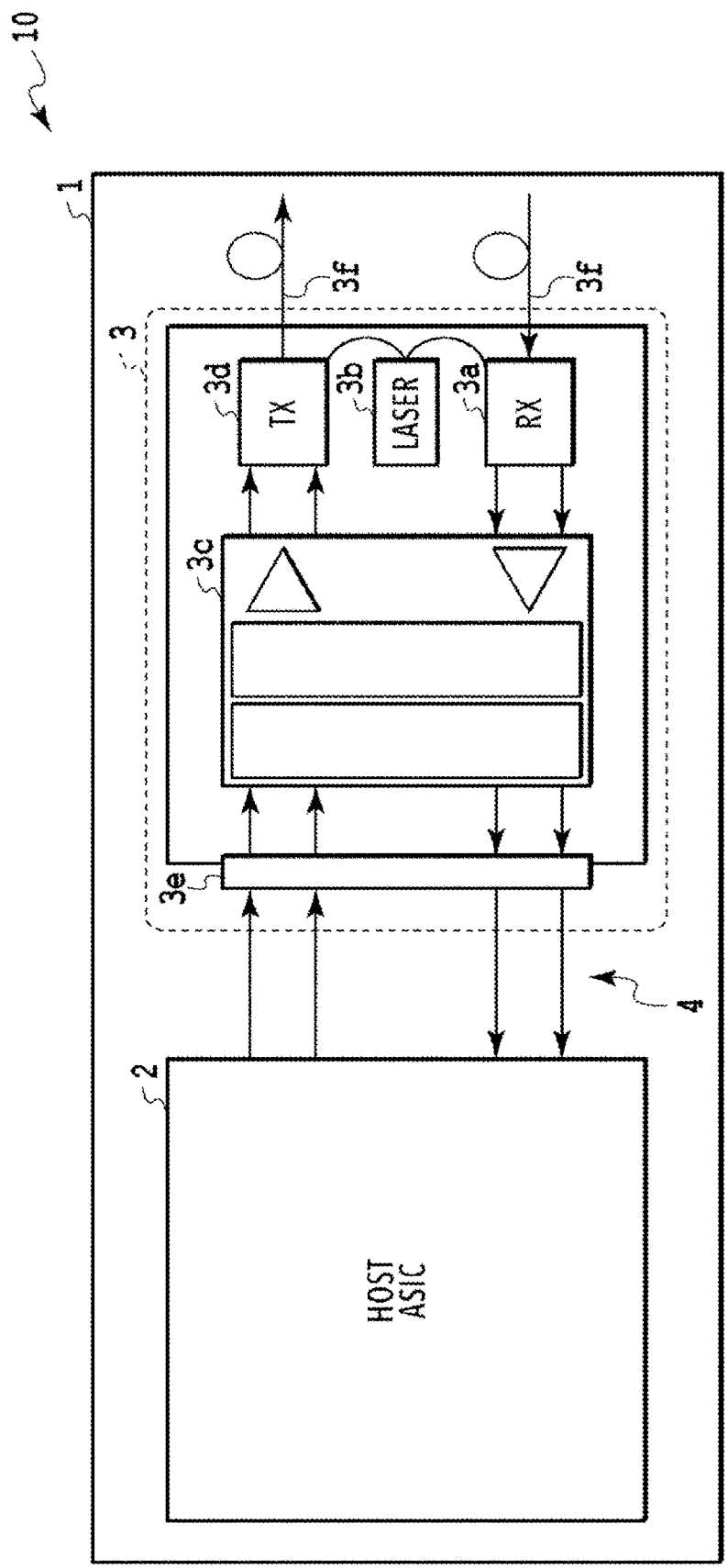
FIG. 1 is a diagram illustrating a schematic configuration of the network switch disclosed in Non-Patent Literature 1, seen from the upper surface direction.

When FIGS. 2(A) and 2(B) are referred to, the photo-electron fusion switch 100 includes a network processor 20 configuring a packet switch, a plurality of optical transmitter/receivers 30 each having a photoelectric conversion function, and an optical device. In this configuration, the network processor 20 is an electronic circuit that controls functions of the packet switch, and can input and output numerous high-speed signals. Each optical transmitter/receiver 30 is provided in the vicinity of the network processor 20 and has a configuration similar to that of the optical transmitter/receiver 3 described with reference to FIG. 1, although only the outer shape thereof is simply illustrated. The optical device is preferably a waveguide type optical switch fabricated by PLC (Planar Lightwave Circuit) technique. In the illustrated embodiment, the optical device is an optical relay switch 60 of an optical switch. It is assumed that, in addition to the optical relay switch 60 illustrated in FIG. 2, the optical device includes a multiplexing/separator having a function of multiplexing signals and separating multiplexed signals, as described in detail below.

In the case of this photo-electron fusion switch 100, it is assumed that an optical network system is constructed when the switch is connected to nodes of a communication source and a communication partner. Therefore, it is preferable that each optical transmitter/receiver 30 can support large-capacity coherent communications. Further, it is assumed that each optical transmitter/receiver 30 can transmit and receive optical signals different in transmission speed to and from respective nodes of the communication source and the communication partner. The photoelectric conversion function of each optical transmitter/receiver 30 is for inputting an optical signal transmitted from a node and outputting an optical/electrically converted electric signal to the network processor 20. Further, the photoelectric conversion function of each optical transmitter/receiver 30 is for transmitting, to a node, an optical signal obtained by electrical/optically converting an electric signal output from the network processor 20.

In this photo-electron fusion switch 100, metal wiring 40 via which electric signals pass is used for the route connecting the network processor 20 and each optical transmitter/receiver 30. Further, an optical waveguide 50 is used for the route connecting each optical transmitter/receiver 30 and the optical device (the optical relay switch 60). It is preferable that this optical waveguide 50 is also used for a route connecting each optical transmitter/receivers 30 or the optical device (the optical relay switch 60) and input-output ports. The pattern of the optical waveguide 50 is actually complicated in routing. Therefore, FIG. 2(A) illustrates only the portions of input-side optical waveguides $50_{IN}$ and output-side optical waveguides $50_{OUT}$ and omits the majority of the optical relay switch 60.

In the photo-electron fusion switch 100, the network processor 20, respective optical transmitter/receivers 30, the waveguide type optical switch (the optical relay switch 60), the metal wiring 40, and the optical waveguide 50 are mounted on an upper surface of the same substrate 11. Further, the metal wiring 40 and the optical waveguide 50 configure an optical waveguide equipped interposer. In this mounting state, it is preferable that the network processor 20, each optical transmitter/receiver 30, and the waveguide type optical switch (the optical relay switch 60) are arranged on the same plane of the upper surface of the optical waveguide equipped interposer. The waveguide type optical switch (the optical relay switch 60) may be configured so as to be integrated as a part of the optical waveguide 50 in the optical waveguide equipped interposer. Further, in the area of the optical waveguide 50 of the waveguide type optical switch (the optical relay switch 60), optical functional devices such as AWG (Arrayed Waveguide Gratings) may be provided in addition to the above-described various types of switches.

Each embodiment of the photo-electron fusion switch 100 having such a configurational outline will be described below. In these embodiments, even when respective nodes of the communication source and the communication partner that are large in transmission capacity are connected, optical communications can be performed without any trouble, and the packet switch and the optical switch are integrated so as to realize a concentrated arrangement of devices having similar functions and reduce the communication processing time. The photo-electron fusion switch 100 configures an optical network system when connected to respective nodes of the communication source and the communication partner.

Embodiment 1

Figure 3:
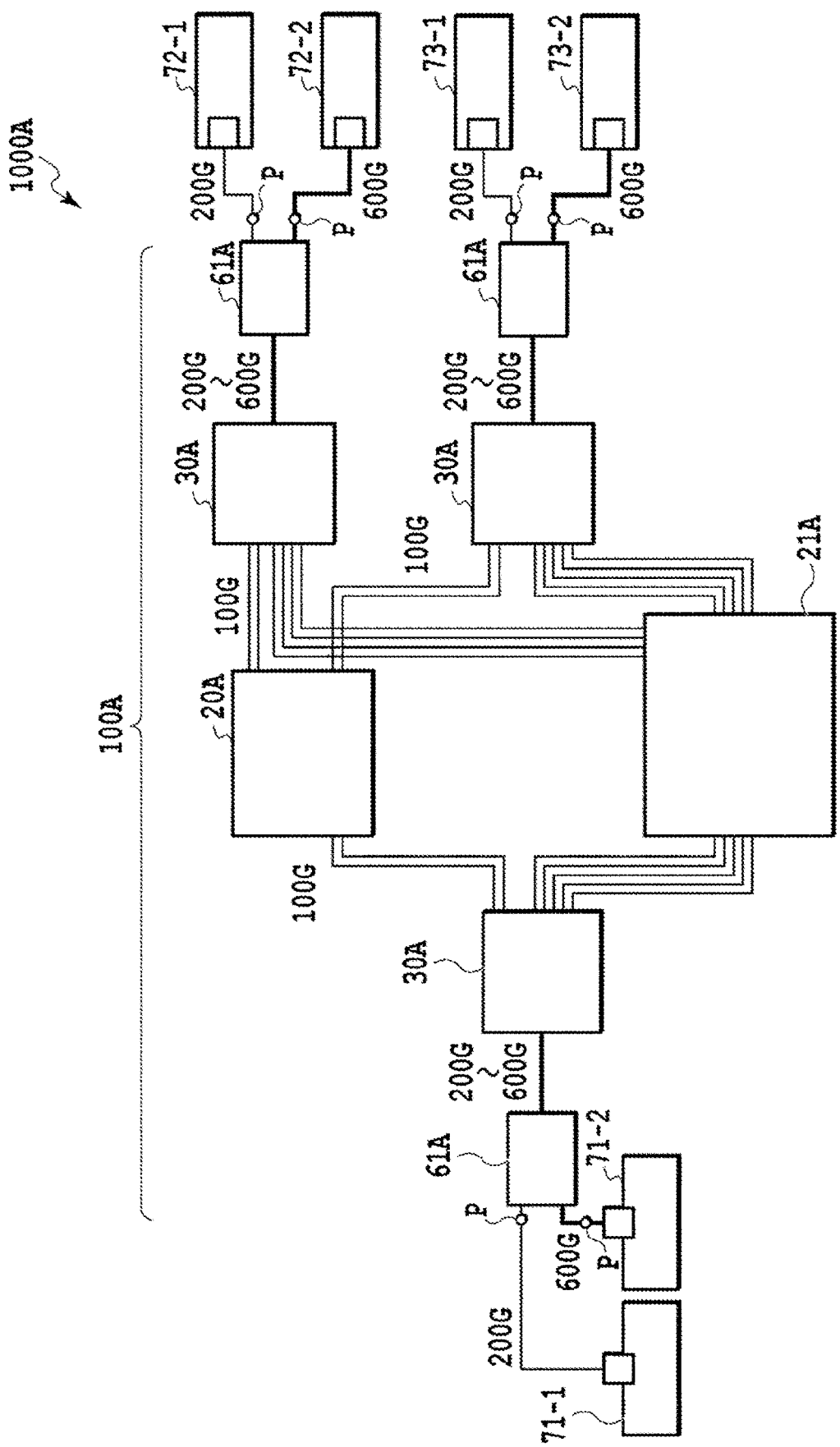
FIG. 3 is a diagram illustrating a schematic configuration of an optical network system including a photo-electron fusion switch according to embodiment 1 of the present invention, seen from the upper surface direction.

FIG. 3 is a diagram illustrating a schematic configuration of an optical network system 1000A including a photo-electron fusion switch 100A according to embodiment 1 of the present invention, seen from the upper surface direction.

When FIG. 3 is referred to, this optical network system 1000A is configured by connecting respective nodes of the communication source and the communication partner to the photo-electron fusion switch 100A. The nodes of the communication source are information processing devices 71-1 and 71-2 that are different in transmission speed. Further, the nodes of the communication partner are information processing devices 72-1 and 72-2 and information processing devices 73-1 and 73-2 that are also different in transmission speed. It is assumed that the information processing devices 71-1, 72-1, and 73-1 have the transmission speed of, for example, 200 Gbps (hereinafter, abbreviated as G), and further, the information processing devices 71-2, 72-2, and 73-2 have the transmission speed of, for example, 600 G.

The photo-electron fusion switch 100A includes a network processor 20A that is an electronic circuit for controlling packet switch functions, a plurality of optical transmitter/receivers 30A having photoelectric conversion function, an optical line switching device 21A, and a plurality of optical switches 61A. In the case of the configuration illustrated in FIG. 3, three optical transmitter/receivers 30A and three optical switches 61A are used. The network processor 20A and each optical transmitter/receiver 30A configure a packet switch. Each optical transmitter/receiver 30A can support coherent communications, and can transmit and receive optical signals different in transmission speed to and from the nodes of the communication source and the communication partner. Further, each optical transmitter/receiver 30A inputs optical signals transmitted from the nodes via input-output ports P, and outputs optical/electrically converted electric signals to the network processor 20A. Further, each optical transmitter/receiver 30A transmits optical signals obtained by electrical/optically converting electric signals output from the network processor 20A to the nodes via the input-output ports P. The optical line switching device 21A has a cross-connection function of setting optical line connection between respective optical transmitter/receivers 30A, and an optical line switching switch or the like may be used.

In this photo-electron fusion switch 100A, wiring such as the above-described metal wiring through which electric signals pass is used for the route connecting the network processor 20A and each optical transmitter/receiver 30A. Examples usable for this route include 100 G×2 for 200 G in which each one is 100 G. Optical waveguides are used as the route connecting the optical line switching device 21A and each optical transmitter/receiver 30A. Examples usable for this route include 100 G×2 for 200 G, 100 G×4 for 400 G, and 100 G×6 for 600 G. However, it is also possible to use wiring through which electric signals pass, as the route connecting the optical line switching device 21A and each optical transmitter/receiver 30A.

Further, optical waveguides are used for the route connecting each optical transmitter/receiver 30A and each optical switch 61A and the route connecting each optical switch 61A and the input-output ports P of the photo-electron fusion switch 100A. The optical waveguides of the former route are for 200 G to 600 G, but the optical waveguides of the latter route include an optical waveguide for 600 G on the side large in transmission speed and an optical waveguide for 200 G on the side small in transmission speed. Optical fibers may be used as exemplary optical waveguides in the routes connecting the information processing devices 71-1 and 71-2, the information processing devices 72-1 and 72-2, and the information processing devices 73-1 and 73-2 to the input-output ports P of the photo-electron fusion switch 100A.

Each optical switch 61A is provided between the nodes and each optical transmitter/receiver 30A. Further, respective optical switches 61A separately transmit and receive respective optical signals different in transmission speed to and from the nodes via the optical waveguides. In the route connecting respective optical transmitter/receivers 30A and respective optical switches 61A, optical signals are input and output via the optical waveguides of 200 G to 600 G. Further, in the route connecting respective optical switches 61A and the input-output ports P of the photo-electron fusion switch 100A and in the route connecting the input-output ports P and the nodes, optical signals are separately input and output via optical waveguides for 200 G having a smaller transmission speed and optical waveguides for 600 G having a larger transmission speed. A frequency filter can be used as each optical switch 61A. In this case, direction switching by frequency switching in each optical transmitter/receiver 30A becomes feasible.

Hereinafter, basic operations in the optical network system 1000A will be described. It is assumed that the optical line switching device 21A automatically sets optical line connection between respective optical transmitter/receivers 30A according to the communication status of packet communication contents of optical signals by the cross-connection function. Further, in this optical network system 1000A, it is assumed that a controller performs control management for the information processing devices 71-1 and 71-2 of the communication source and the information processing devices 72-1 and 72-2 and the information processing devices 73-1 and 73-2 of the communication partner. The controller performs the control management according to an application designed in advance. In this embodiment, the controller controls the optical switches 61A and the optical line switching device 21A in the photo-electron fusion switch 100A.

First, an operation for performing optical communications from the information processing devices 71-1 and 71-2 being communication source's nodes to at least one of the information processing devices 72-1 and 72-2 and the information processing devices 73-1 and 73-2, which are communication partner's nodes, will be described. In this case, either the optical signal of 200 G or the optical signal of 600 G is transmitted from the information processing devices 71-1 and 71-2 being the communication source's nodes to the optical switch 61A, via the optical waveguide for 200 G and the optical waveguide for 600 G. The optical switch 61A transmits either the optical signal of 200 G or the optical signal of 600 G to the optical transmitter/receiver 30A via the optical waveguide for 200 G to 600 G. The optical transmitter/receiver 30A can use optical lines set by the optical line switching device 21A. It is assumed that the optical lines usable here are 200 G, 400 G, and 600 G.

The optical transmitter/receiver 30A transmits an electric signal obtained by optical/electrically converting either the optical signal for 200 G or the optical signal for 600 G to the network processor 20A. In the network processor 20A, the input electric signal that is either the electric signal for 200 G or the electric signal for 600 G is subjected to packet switch function related signal processing and is then separately transmitted to at least one of another dual-system optical transmitter/receivers 30A, respectively. These optical transmitter/receivers 30A separately transmit either the optical signal for 200 G or the optical signal for 600 G, which is obtained by electrical/optically converting the signal processed electric signal, to any of the dual-system optical switches 61A, respectively. At least one of the dual-system optical switches 61A separately transmits the optical signal for 200 G to any of the information processing devices 72-1 and 73-1 and the optical signal for 600 G to any of the information processing devices 72-2 and 73-2, respectively.

Next, an operation for performing optical communication from at least one of the information processing devices 72-1 and 72-2 and the information processing devices 73-1 and 73-2, which are the communication partner's nodes, to the information processing devices 71-1 and 71-2 being the communication source's nodes will be described. In this case, either the optical signal of 200 G or the optical signal of 600 G is transmitted from at least one of the information processing devices 72-1 and 72-2 and the information processing devices 73-1 and 73-2, which are the communication partner's nodes, to at least one of the dual-system optical switches 61A, via the optical waveguide for 200 G and the optical waveguide for 600 G. In at least one of respective optical switches 61A, either the optical signal of 200 G and the optical signal of 600 G is transmitted to at least one of the dual-system optical transmitter/receivers 30A via the optical waveguide of 200 G to 600 G. In at least one of respective optical transmitter/receivers 30A, optical lines set by the optical line switching device 21A can be used. It is assumed that the optical lines usable here are 200 G, 400 G, and 600 G.

At least one of respective optical transmitter/receivers 30A transmits an electric signal obtained by optical/electrically converting either the optical signal for 200 G or the optical signal for 600 G to the network processor 20A. In the network processor 20A, the input electric signal that is either the electric signal for 200 G or the electric signal for 600 G is subjected to the packet switch function related signal processing and is transmitted to another single-system optical transmitter/receiver 30A. This optical transmitter/receiver 30A also transmits either the optical signal for 200 G or the optical signal for 600 G obtained by electrical/optically converting the signal processed electric signal to the single-system optical switch 61A. The optical switch 61A separately transmits the optical signal for 200 G to the information processing device 71-1 and transmits the optical signal for 600 G to the information processing device 71-2, respectively.

According to the optical network system 1000A using the photo-electron fusion switch 100A of embodiment 1, each optical transmitter/receiver 30A configuring a packet switch can support large-capacity coherent communications and can transmit and receive optical signals different in transmission speed to and from the nodes of the communication source and the communication partner. Further, the optical switches 61A and the optical line switching device 21A cooperate with each other so that the optical line connection can be appropriately changed according to packet communication contents of optical signals. Therefore, even when the nodes of the communication source and the communication partner that are large in transmission capacity are connected, the optical network system 1000A works in the same way as when performing the optical cut-through and can perform optical communications without any trouble with less burden in signal processing that consumes electric power, and makes it possible to realize a concentrated arrangement of devices having similar functions and reduce the communication processing time.

Embodiment 2

Figure 4:
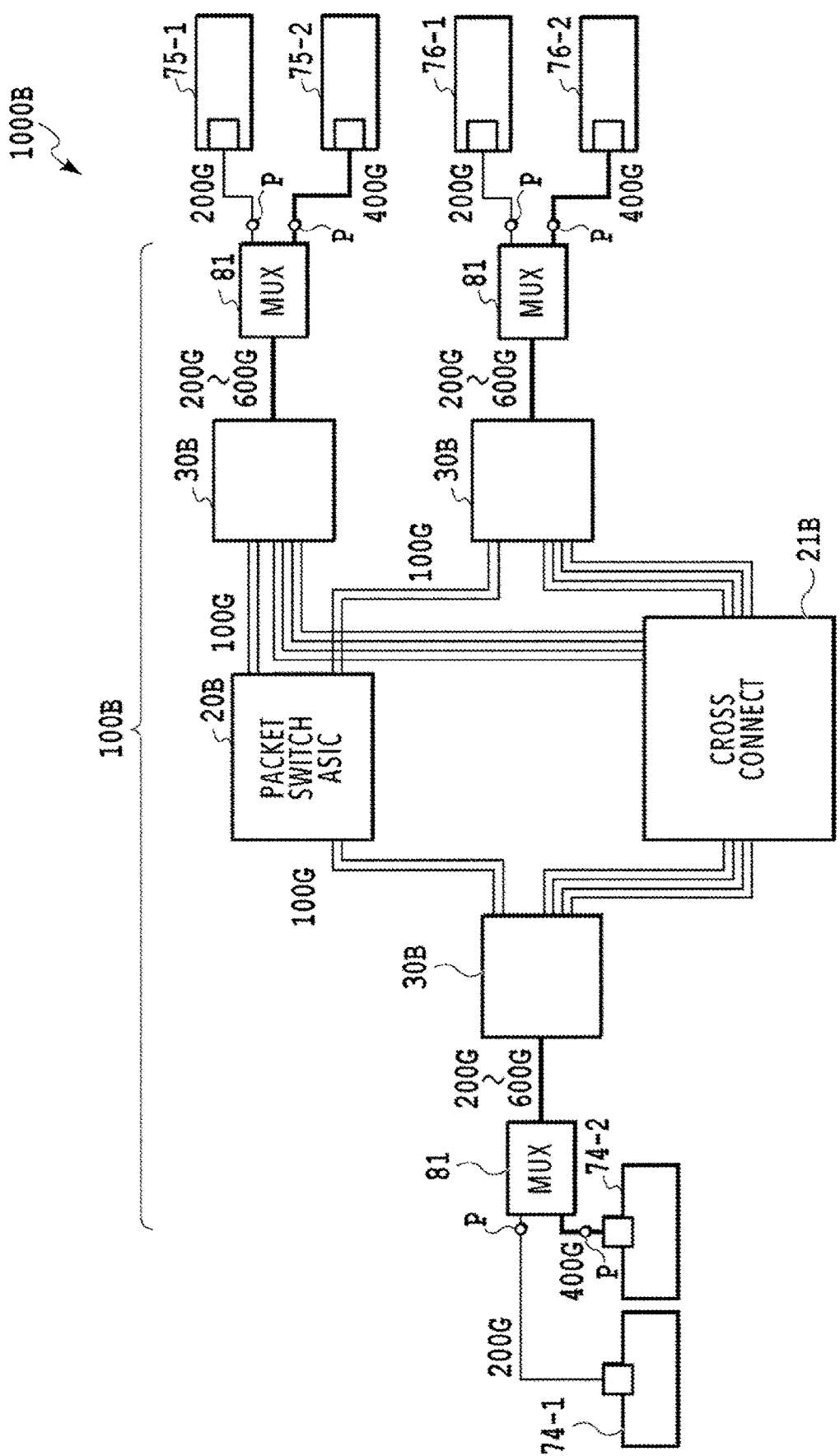
FIG. 4 is a diagram illustrating a schematic configuration of an optical network system including a photo-electron fusion switch according to embodiment 2 of the present invention, seen from the upper surface direction.

FIG. 4 is a diagram illustrating a schematic configuration of an optical network system 1000B including a photo-electron fusion switch 100B according to embodiment 2 of the present invention, seen from the upper surface direction.

When FIG. 4 is referred to, this optical network system 1000B is also configured by connecting nodes of a communication source and a communication partner to the photo-electron fusion switch 100B. The nodes of the communication source are information processing devices 74-1 and 74-2 that are different in transmission speed. Further, the nodes of the communication partner are information processing devices 75-1 and 75-2 and the information processing devices 76-1 and 76-2 that are also different in transmission speed. It is assumed that the information processing devices 74-1, 75-1, and 76-1 are 200 G in transmission speed, and further, the information processing devices 74-2, 75-2, and 76-2 are 400 G in transmission speed.

The photo-electron fusion switch 100B includes a network processor 20B that is an electronic circuit for controlling packet switch functions, a plurality of optical transmitter/receiver 30B each having a photoelectric conversion function, an optical line switching device 21B, and a plurality of multiplexing/separators 81. In the case of the configuration illustrated in FIG. 4, three optical transmitter/receivers 30B and three multiplexing/separators 81 are used. The network processor 20B and each optical transmitter/receiver 30B configure a packet switch. That is, the photo-electron fusion switch 100B does not include the optical switches 61A of embodiment 1 and is different in that the multiplexing/separators 81 are used to simultaneously transmit the optical signal of 200 G and the optical signal of 600 G. Even in this embodiment, each optical transmitter/receiver 30B is configured to be able to support large-capacity coherent communication. In the route connecting the information processing devices 74-1 and 74-2, the information processing devices 75-1 and 75-2, and the information processing devices 76-1 and 76-2 to the input-output ports P of the photo-electron fusion switch 100B, optical fibers may be used as exemplary optical waveguides. Other detailed configurations are common and therefore common parts will not be described.

Each multiplexing/separator 81 is provided between the nodes and each optical transmitter/receiver 30B. Further, each multiplexing/separator 81 simultaneously transmits and receives respective optical signals different in transmission speed to and from the nodes via the optical waveguides. In the route connecting each optical transmitter/receiver 30B and each multiplexing/separator 81, optical signals are input and output via the optical waveguide for 200 G to 600 G. Further, in the route connecting each multiplexing/separator 81 and the input-output ports P of the photo-electron fusion switch 100B, and in the route connecting the input-output ports P and the nodes, optical signals are simultaneously input and output via optical waveguides for 200 G, which are smaller in transmission speed, and optical waveguides for 400 G, which are larger in transmission speed.

Hereinafter, basic operations in the optical network system 1000B will be described. It is assumed that the optical line switching device 21B automatically sets optical line connection between respective optical transmitter/receivers 30B according to the communication status of packet communication contents of optical signals by the cross-connection function. Further, even in this optical network system 1000B, it is assumed that a controller performs control management for the information processing devices 74-1 and 74-2 of the communication source and the information processing devices 75-1 and 75-2 and the information processing devices 76-1 and 76-2 of the communication partner. The controller performs the control management according to an application designed in advance, and controls the multiplexing/separators 81 and the optical line switching device 21B in the photo-electron fusion switch 100B.

First, an operation for performing optical communications from the information processing devices 74-1 and 74-2 being the communication source's nodes to at least one of the information processing devices 75-1 and 75-2 and the information processing devices 76-1 and 76-2, which are the communication partner's nodes, will be described. In this case, the optical signal of 200 G and the optical signal of 400 G are simultaneously transmitted from the information processing devices 74-1 and 74-2 being the communication source's nodes to the multiplexing/separator 81, via the optical waveguide for 200 G and the optical waveguide for 400 G. The multiplexing/separator 81 transmits an optical signal obtained by multiplexing the optical signal of 200 G and the optical signal of 400 G to the optical transmitter/receiver 30B via the optical waveguide for 200 G to 600 G. The optical transmitter/receiver 30B can use optical lines switched by the optical line switching device 21B. It is assumed that the optical lines usable here are 200 G, 400 G, and 600 G.

The optical transmitter/receiver 30B transmits an electric signal obtained by optical/electrically converting the multiplexed optical signal to the network processor 20B. The network processor 20B performs packet switch function related signal processing on the input electric signal and separately transmits the processed signal to at least one of another dual-system optical transmitter/receivers 30B, respectively. These optical transmitter/receivers 30B also separately transmit a multiplexed optical signal obtained by electrical/optically converting the signal processed multiplexed electric signal to at least one of the dual-system multiplexing/separators 81, respectively. At least one of the dual-system multiplexing/separators 81 separates the multiplexed optical signal and simultaneously transmits the optical signal for 200 G to any of the information processing devices 72-1 and 73-1 and the optical signal for 400 G to any of the information processing devices 72-2 and 73-2, respectively.

Next, an operation for performing optical communications from at least one of the information processing devices 75-1 and 75-2 and the information processing devices 76-1 and 76-2, which are communication partner's nodes, to the information processing devices 74-1 and 74-2 being the communication source's nodes will be described. In this case, from at least one of the information processing devices 75-1 and 75-2 and the information processing devices 76-1 and 76-2, which are the communication partner's nodes, to at least one of the dual-system multiplexing/separators 81, the optical signal of 200 G and the optical signal of 400 G are simultaneously transmitted via the optical waveguide for 200 G and the optical waveguide for 400 G. At least one of respective multiplexing/separators 81 transmits an optical signal obtained by multiplexing the optical signal of 200 G and the optical signal of 400 G to at least one of the dual-system optical transmitter/receivers 30B via the optical waveguide for 200 G to 600 G. At least one of respective optical transmitter/receivers 30B can use optical lines switched by the optical line switching device 21B. It is assumed that the optical lines usable here are 200 G, 400 G, and 600 G.

At least one of respective optical transmitter/receivers 30B transmits an electric signal obtained by optical/electrically converting the multiplexed optical signal to the network processor 20B. The network processor 20B performs packet switch function related signal processing on the input electric signal and transmits the processed signal to another single-system optical transmitter/receiver 30B. This optical transmitter/receiver 30B also transmits an optical signal obtained by electrical/optically converting the signal processed multiplexed electric signal to the single-system multiplexing/separator 81. The multiplexing/separator 81 separates the multiplexed optical signal, and simultaneously transmits the optical signal for 200 G to the information processing device 74-1 and the optical signal for 400 G to the information processing device 74-2, respectively.

According to the optical network system 1000B using the photo-electron fusion switch 100B of embodiment 2, each optical transmitter/receiver 30B configuring a packet switch can support large-capacity coherent communications and can transmit and receive optical signals different in transmission speed to and from the nodes of the communication source and the communication partner. Further, in the optical network system 1000B, the multiplexing/separators 81 and the optical line switching device 21B cooperate with each other so that the optical line connection can be appropriately changed according to packet communication contents of optical signals. Therefore, even when the nodes of the communication source and the communication partner that are large in transmission capacity are connected, the optical network system 1000B works in the same way as when performing the optical cut-through and can perform optical communications without any trouble with less burden in signal processing that consumes electric power, and makes it possible to realize a concentrated arrangement of devices having similar functions and reduce the communication processing time. Especially, since the photo-electron fusion switch 100B can simultaneously transmit and receive optical signals different in transmission speed to and from the nodes of the communication source and the communication partner using the multiplexing/separators 81, there is an advantage that the signal processing can be performed more quickly than in the case of embodiment 1.

Embodiment 3

Figure 5:
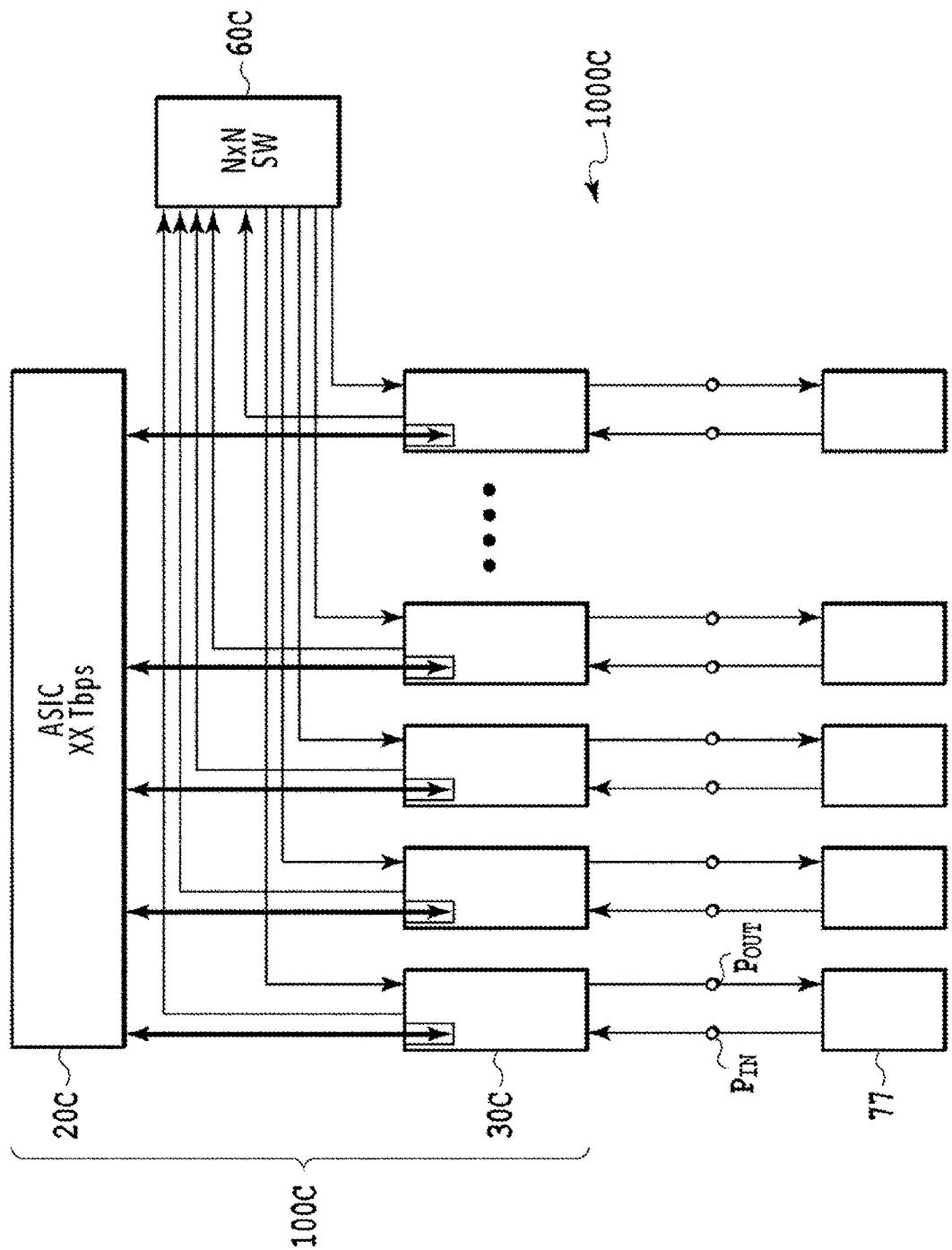
FIG. 5 is a diagram illustrating a schematic configuration of an optical network system including a photo-electron fusion switch according to embodiment 3 of the present invention, seen from the upper surface direction.

FIG. 5 is a diagram illustrating a schematic configuration of an optical network system 1000C including a photo-electron fusion switch 100C according to embodiment 3 of the present invention, seen from the upper surface direction.

When FIG. 5 is referred to, this optical network system 1000C is also configured by connecting nodes of a communication source and a communication partner to the photo-electron fusion switch 100C. Here, the nodes are a plurality of information processing devices 77 that are different in transmission speed. Each information processing device 77 has a function of switching the transmission speed to 200 G, 400 G, or 600 G.

The photo-electron fusion switch 100C includes a network processor 20C that is an electronic circuit for controlling packet switch functions, a plurality of optical transmitter/receivers 30C having a photoelectric conversion function, and an optical relay switch 60C. The network processor 20C and each optical transmitter/receiver 30C configure a packet switch. The optical relay switch 60C serving as an optical switch is configured as a N×N type (N inputs and N outputs) in which N is a natural number equal to or greater than 2. The N×N type indicates that N inputs and N outputs are performed. Further, the optical relay switch 60C plays the role of inputting respective optical signals output from specific locations of respective optical transmitter/receivers 30C, folding back the optical signals by another route and transmitting the optical signals to other specific locations of respective optical transmitter/receivers 30C.

In the case of this photo-electron fusion switch 100C, the route connecting the network processor 20C and each optical transmitter/receiver 30C is configured by wiring through which the electric signals pass. In the route connecting each optical transmitter/receiver 30C and the optical relay switch 60C, the route connecting each optical transmitter/receiver 30C and an input port $P_{IN}$ of the photo-electron fusion switch 100C, the route connecting each optical transmitter/receiver 30C and an output port $P_{OUT}$ of the photo-electron fusion switch 100C are configured as optical waveguides. Here, in the route connecting the input port $P_{IN}$ and the output port $P_{OUT}$ of the photo-electron fusion switch 100C to each information processing device 77, optical fibers may be used as exemplary optical waveguides.

Each optical transmitter/receiver 30C can support large-capacity coherent communications, and is configured to be able to transmit and receive optical signals different in transmission speed (200 G, 400 G, and 600 G) to and from respective information processing devices 77. Further, respective optical transmitter/receivers 30C input the optical signals transmitted from respective information processing devices 77 and output optical/electrically converted electric signals to the network processor 20C. An exemplary case in which the wiring used here is 100 G×2 for 200 G can be illustrated. Further, respective optical transmitter/receivers 30C transmit optical signals obtained by electrical/optically converting electric signals output from the network processor 20C to respective information processing devices 77. Further, each optical transmitter/receiver 30C has a function of connecting an optical signal obtained by electrical/optically converting the electric signal whose transmission speed is a specific amount (e.g., 400 G) to the optical relay switch 60C. In this case, assuming that a specific information processing device 77 transmits an optical signal of 600 G, it is considered that the transmission speed 200 G of an electric signal transmitted to the network processor 20C by the optical transmitter/receiver 30C having received this optical signal and the transmission speed 400 G of an optical signal transmitted to another information processing device 77 via the optical relay switch 60C are multiplexed. In the electrical/optical conversion of transmission speed 400 G, division into 100 G×4 or the like is also feasible.

This photo-electron fusion switch 100C can partly change the function configuration of each optical transmitter/receiver 30C by selecting the transmission speed of the optical signal transmitted from each information processing device 77 according to the processing capacity of the network processor 20C. For example, if the transmission speed of the optical signal from each information processing device 77 is limited to 400 G, it is unnecessary for the photo-electron fusion switch 100C to configure at least a part of each optical transmitter/receiver 30C as the route, i.e., the wiring through which the electric signal passes. Further, if the transmission speed of the optical signal from each information processing device 77 is limited to 200 G, at least a part of each optical transmitter/receiver 30C in the photo-electron fusion switch 100C can be configured so as to have no electrical/optical conversion function for 400 G, according to the number of input-output ports of the optical relay switch 60C.

According to the optical network system 1000C using the photo-electron fusion switch 100C of embodiment 3, respective optical transmitter/receivers 30C configuring the packet switch can support large-capacity coherent communications and can transmit and receive optical signals different in transmission speed to and from the nodes of the communication source and the communication partner. Further, respective optical transmitter/receivers 30C connect optical signals obtained by electrical/optically converting electric signals whose transmission speed is a specific amount to the optical relay switch 60C, and the optical relay switch 60C transmits the optical signals to other specific locations of respective optical transmitter/receivers 30C via another route. The optical relay switch 60C here is functionally equivalent to the optical line switching devices 21A and 21B of embodiments 1 and 2. Therefore, even when the nodes of the communication source and the communication partner that are large in transmission capacity are connected, the optical network system 1000C works in the same way as when performing the optical cut-through and can perform optical communications without any trouble with less burden in signal processing that consumes electric power, and makes it possible to realize a concentrated arrangement of devices having similar functions and reduce the communication processing time.

Further, the photo-electron fusion switch 100C can partly change the function configuration of each optical transmitter/receiver 30C according to the processing capacity of the network processor 20C or the number of input-output ports of the optical relay switch 60C. As a result, the configuration can be simplified as compared with the case of embodiment 1 or embodiment 2, and further at least a part of each optical transmitter/receiver 30C can be prevented from being involved in or working for the signal processing by the network processor 20C. This brings an advantage of avoiding the risk that the photoelectric conversion function may not be sufficiently exerted in addition to reduction in electric power consumption.

By the way, in the case of incorporating the above-described photo-electron fusion switches 100A, 100B, and 100C in the optical network systems 1000A, 1000B, and 1000C respectively, it depends on the setting function of nodes to be connected. That is, the optical network systems 1000A, 1000B, and 1000C cause the controller to perform necessary control for the nodes of the communication source and the communication partner according to the designed application.

However, applications for causing the nodes of the communication source and the communication partner that are large in transmission capacity to perform optical communications are not sufficiently considered. There is no countermeasure against shortening of the transmittable distance with increasing transmission capacity. Therefore, at present, dynamically changing the optical transmission line control according to an application's request and effectively utilizing information about remotely located resources are difficult. Accordingly, setting contents for the nodes become important in designing the application. In particular, an application for stable optical communications is required.

Hereinafter, in the optical network systems 1000A, 1000B, and 1000C, the settings causing the controller to perform necessary control for the nodes according to an application designed in advance will be described. That is, such settings enable dynamically changing the optical transmission line control according to an application's request and effectively utilizing information about remotely located resources. However, it is assumed that the nodes in this case are information processing devices that are large in transmission capacity, represented by client computers and storage systems.

In such a case, it is effective for the controller to set control other than the route control and the band control and cause the information processing devices to execute it, as the necessary control, in the photo-electron fusion switches 100A, 100B, and 100C. For example, an effective control is at least one of delay and jitter controls relating to optical signal or electric signal in all transmission paths to be used. Further, another effective control is any one of route/resource information competitive control, plan control, and safety control in all transmission paths using previously acquired network-related resource information, plan information, and safety information. Further, the controller causes the information processing device to execute control for optimizing at least one of the delay and encryption intensity by cooperation between layers in the information processing device. Setting such controls in the information processing device can dynamically change the optical transmission line control according to an application's request and can effectively utilize the information about remotely located resources. Hereinafter, specific examples will be described.

Figure 6:
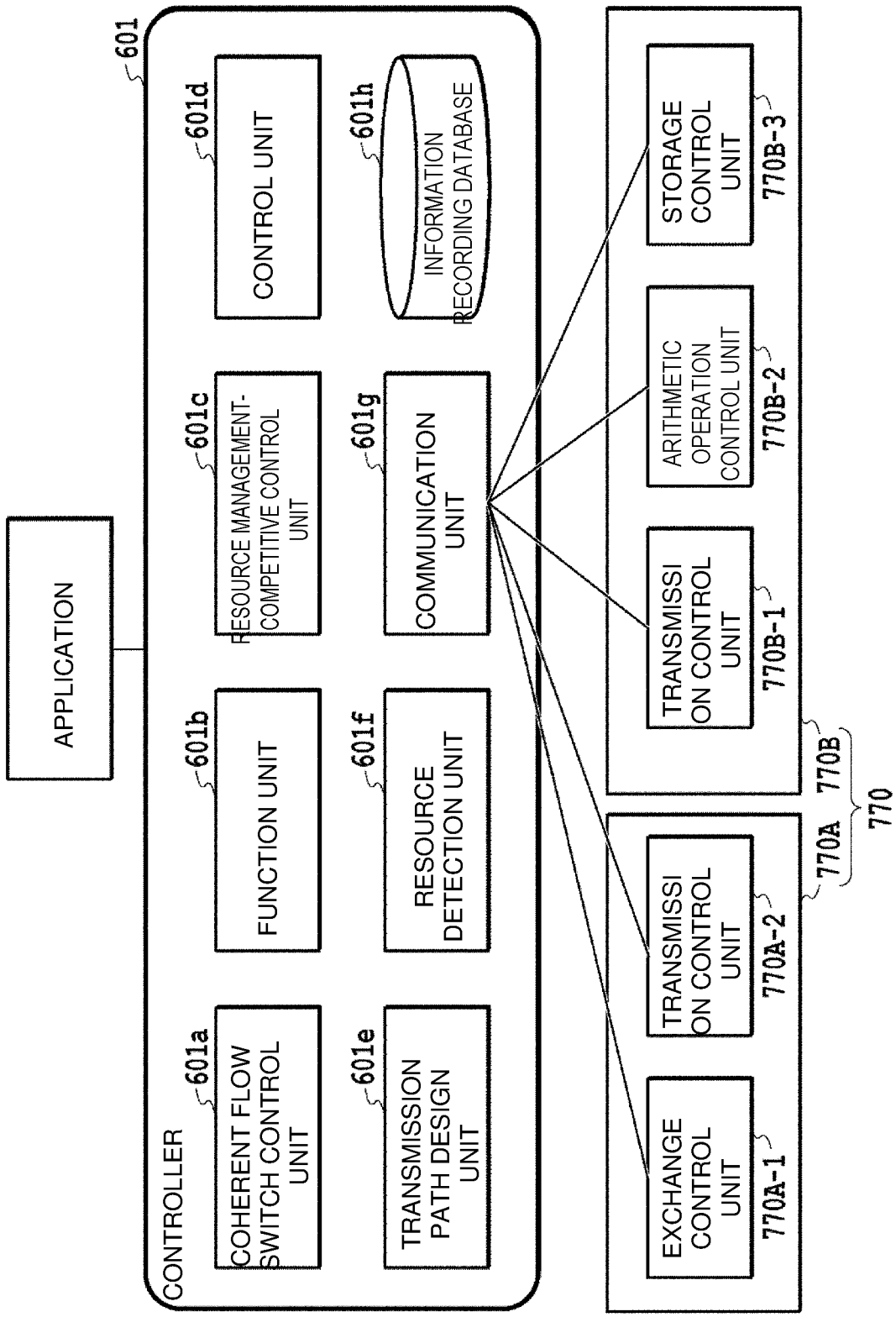
FIG. 6 is a functional block diagram illustrating the correspondence between an application necessary for a controller to control and manage information processing devices serving as nodes of a communication source and a communication partner and functions of respective units, in the optical network systems according to embodiments 1 to 3 of the present invention.

FIG. 6 is a functional block diagram illustrating the correspondence between an application necessary for a controller 601 to control and manage an information processing device 770 serving as nodes of a communication source and a communication partner and functions of respective units, in the optical network systems 1000A, 1000B, and 1000C according to embodiments 1 to 3 of the present invention.

When FIG. 6 is referred to, the controller 601 that sets the designed application to the information processing device 770 includes a coherent flow switch control unit 601a and an orchestration function unit 601b. Further, in addition, the controller 601 includes a resource management-competitive control unit 601c, a security control unit 601d, a transmission path design unit 601e, a resource detection unit 601f, a communication unit 601g, and an information recording database 601h.

On the other hand, the information processing device 770 is roughly divided into an exchange unit 770A and an arithmetic operation/storage unit 770B. The exchange unit 770A includes an exchange control unit 770A-1 and a transmission control unit 770-B, as respective units capable of transmitting and receiving information to and from the communication unit 601g of the controller 601. Objects to which the exchange control function of the exchange control unit 770A-1 belongs include packet switch, electrical cross-connection, optical cross-connection, forward error correction (FEC), optical switch, and MACSEC. Objects to which the transmission control function of the transmission control unit 770-B belongs include coherent communication corresponding signal processing (DSP), wavelength-variable laser, forward error correction, and layer 1 encryption.

Similarly, the arithmetic operation/storage unit 770B includes a transmission control unit 770B-1, an arithmetic operation control unit 770B-2, and a storage control unit 770B-3, as respective units capable of transmitting and receiving information to and from the communication unit 601g of the controller 601. Objects to which the transmission control function of the transmission control unit 770B-1 belongs include coherent communication corresponding signal processing, wavelength-variable laser, forward error correction, and layer 1 encryption. Objects to which the arithmetic operation control function of the arithmetic operation control unit 770B-2 belongs include memory, storage, and MACSEC. Objects to which the storage control function of the storage control unit 770B-3 belongs include processor and storage.

FIG. 7 is a flowchart illustrating the outline of operation processing relating to various control settings for the information processing device 770 performed by the above-described controller 601 according to the application.

When FIG. 7 is referred to, first in step S701, the resource detection unit 601f of the controller 601 communicates with the exchange unit 770A and the arithmetic operation/storage unit 770B via the communication unit 601g. Thus, the resource detection unit 601f grasps the capability indicating information about devices mounted in each of the exchange unit 770A and the arithmetic operation/storage unit 770B, and records capability information in the information recording database 601h.

Next, in step S702, the transmission path design unit 601e calculates parameters, such as band, delay, and jitter, for all transmission paths settable between the exchange unit 770A and the arithmetic operation/storage unit 770B. Then, the transmission path design unit 601e records parameter information in the information recording database 601h.

Further, in step S703, the security control unit 601d calculates parameters such as band, delay, and jitter for all security functions settable between the exchange unit 770A and the arithmetic operation/storage unit 770B. Then, the security control unit 601d records parameter information in the information recording database 601h.

Subsequently, in step S704, the orchestration function unit 601b constructs an optimum system by combining arithmetic operation/storage/network resources recorded in the information recording database 601h, based on an arithmetic operation request or a storage request such as backup from the application.

Further, in step S705, the orchestration function unit 601b confirms with the resource management-competitive control unit 601c about the availability of resources required for the constructed system. As a result, in step S706, it is determined whether the availability is OK. If the determination result is affirmative (available, OK), the processing proceeds to the next step S707. If the availability is negated, the processing returns to step S704 and repeats the following processing.

Finally, in step S707, the coherent flow switch control unit 601a and the security control unit 601d perform settings, via the communication unit 601g, for the exchange unit 770A and the arithmetic operation/storage unit 770B, based on the system constructed by the orchestration function unit 601b. As a result, the settings for the above-described subordinate objects, relating to respective functions of the exchange control unit 770A-1 and the transmission control unit 770-B in the exchange unit 770A, terminates. Further, the settings for the above-described subordinate objects, relating to respective functions of the transmission control unit 770B-1, the arithmetic operation control unit 770B-2, and the storage control unit 770B-3 in the arithmetic operation/storage unit 770B, terminates similarly.

As described above, it suffices that the controller 601 sets the application designed by fully considering the connection of the information processing devices 770, which are large in transmission capacity and different in transmission speed, for respective information processing devices 770. The setting of such an application to the information processing devices 770 can be applied to the optical network systems 1000A, 1000B, and 1000C according to embodiments 1 to 3. In such a case, the optical network systems 1000A, 1000B, and 1000C can dynamically change the optical transmission line control and can effectively utilize information about remotely located resources.

The invention claimed is:

1. A photo-electron fusion switch that includes a packet switch and an optical device and is connected to nodes of a communication source and a communication partner, wherein
    the packet switch includes an electronic circuit and a plurality of optical transmit and receive components each having a photoelectric conversion function and provided in a vicinity of the electronic circuit,
    a route connecting the electronic circuit and the plurality of optical transmit and receive components is wiring through which electric signals pass,
    a route connecting the plurality of optical transmit and receive components and the optical device and a route connecting the optical device or the plurality of optical transmit and receive components and input-output ports of the photo-electron fusion switch are optical waveguides, and
    the plurality of optical transmit and receive components configured to transmit and receive optical signals different in transmission speed to and from the nodes of the communication source and the communication partner, and are configured to input the optical signals transmitted from the nodes, output converted electric signals to the electronic circuit, and transmit optical signals obtained by converting electric signals output from the electronic circuit to the nodes, wherein
    the optical device is an optical relay switch that inputs respective optical signals output from specific locations of the plurality of optical transmit and receive components, folds back the optical signals by another route, and transmits the optical signals to other specific locations of the plurality of optical transmit and receive components, and
    the plurality of optical transmit and receive components can support coherent communications, and connect optical signals obtained by converting electric signals whose transmission speed is a specific amount to the optical relay switch.

2. The photo-electron fusion switch according to claim 1, wherein
    the optical device is a waveguide type optical switch fabricated by PLC (Planar Lightwave Circuit) technique,
    the electronic circuit, the plurality of optical transmit and receive components, the waveguide type optical switch, the wiring, and the optical waveguides are mounted on an upper surface of the same substrate,
    the wiring and the optical waveguide configure an optical waveguide equipped interposer, and the electronic circuit, the plurality of optical transmit and receive components, and the waveguide type optical switch are arranged on the same plane of an upper surface of the optical waveguide equipped interposer in a mounting state.

3. A photo-electron fusion switch that includes a packet switch and an optical device and is connected to nodes of a communication source and a communication partner, wherein the packet switch includes an electronic circuit and a plurality of optical transmit and receive components each having a photoelectric conversion function and provided in a vicinity of the electronic circuit, a route connecting the electronic circuit and the plurality of optical transmit and receive components is wiring through which electric signals pass, a route connecting the plurality of optical transmit and receive components and the optical device and a route connecting the optical device or the plurality of optical transmit and receive components and input-output ports of the photo-electron fusion switch are optical waveguides, and the plurality of optical transmit and receive components configured to transmit and receive optical signals different in transmission speed to and from the nodes of the communication source and the communication partner, and are configured to input the optical signals transmitted from the nodes, output converted electric signals to the electronic circuit, and transmit optical signals obtained by converting electric signals output from the electronic circuit to the nodes, wherein the optical device includes the optical switch and an optical line switching device having a cross-connection function for setting optical line connection between the plurality of optical transmit and receive components, each of the plurality of optical transmit and receive components supporting coherent communications, and the optical switch is provided between the nodes and the plurality of optical transmit and receive components, and separately transmits and receives the optical signals different in transmission speed to and from the nodes via the optical waveguides.

4. The photo-electron fusion switch according to claim 3, wherein the optical device is a waveguide type optical switch fabricated by PLC (Planar Lightwave Circuit) technique, the electronic circuit, the plurality of optical transmit and receive components, the waveguide type optical switch, the wiring, and the optical waveguides are mounted on an upper surface of the same substrate, the wiring and the optical waveguide configure an optical waveguide equipped interposer, and the electronic circuit, the plurality of optical transmit and receive components, and the waveguide type optical switch are arranged on the same plane of an upper surface of the optical waveguide equipped interposer in a mounting state.

5. A photo-electron fusion switch that includes a packet switch and an optical device and is connected to nodes of a communication source and a communication partner, wherein the packet switch includes an electronic circuit and a plurality of optical transmit and receive components each having a photoelectric conversion function and provided in a vicinity of the electronic circuit, a route connecting the electronic circuit and the plurality of optical transmit and receive components is wiring through which electric signals pass, a route connecting the plurality of optical transmit and receive components and the optical device and a route connecting the optical device or the plurality of optical transmit and receive components and input-output ports of the photo-electron fusion switch are optical waveguides, and the plurality of optical transmit and receive components configured to transmit and receive optical signals different in transmission speed to and from the nodes of the communication source and the communication partner, and are configured to input the optical signals transmitted from the nodes, output converted electric signals to the electronic circuit, and transmit optical signals obtained by converting electric signals output from the electronic circuit to the nodes, wherein the optical device includes multiplexing and separating components, and an optical line switching device having a cross-connection function for setting optical line connection between the plurality of optical transmit and receive components, the plurality of optical transmit and receive components supporting coherent communications, the multiplexing and separating components are provided between the nodes and the plurality of optical transmit and receive components, and simultaneously transmit and receive the optical signals different in transmission speed to and from the nodes via the optical waveguides, the optical device is a waveguide type optical switch fabricated by PLC Planar Lightwave Circuit) technique, the electronic circuit, the plurality of optical transmit and receive components, the waveguide type optical switch, the wiring, and the optical waveguides are mounted on an upper surface of the same substrate, the wiring and the optical waveguide configure an optical waveguide equipped interposer, and the electronic circuit, the plurality of optical transmit and receive components, and the waveguide type optical switch are arranged on the same plane of an upper surface of the optical waveguide equipped interposer in a mounting state.

6. The photo-electron fusion switch according to claim 5, wherein the waveguide type optical switch is integrated as a part of the optical waveguide in the optical waveguide equipped interposer.

7. An optical network system that includes the photo-electron fusion switch according to claim 5 and nodes of a communication source and a communication partner, wherein a controller is provided to perform necessary control for the nodes, the nodes are information processing devices, and the controller sets to and causes the information processing devices to execute, as the necessary control, at least one of delay and jitter controls relating to optical signal or electric signal in all transmission paths to be used, and route information competitive control, plan control, and safety control in all the transmission paths using previously acquired network-related resource information, plan information, and safety information, in addition to route control and band control in the photo-electron fusion switch.

8. The optical network system according to claim 7, wherein
the controller causes the information processing device to execute control for optimizing at least one of the delay and encryption by cooperation between layers in the information processing device.

* * * * *